(12) United States Patent
Grant et al.

(10) Patent No.: US 6,676,020 B2
(45) Date of Patent: Jan. 13, 2004

(54) RADIATION DIRECTOR APPARATUS AND METHOD USING PIEZOELECTRIC MOVEMENT

(75) Inventors: Wayne E. Grant, Fort Collins, CO (US); Douglas A Dale, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 84 days.

(21) Appl. No.: 10/000,818

(22) Filed: Nov. 30, 2001

(65) Prior Publication Data

US 2003/0102378 A1 Jun. 5, 2003

(51) Int. Cl.⁷ ................................................ G06K 7/10
(52) U.S. Cl. .............................. 235/462.45; 235/462.32
(58) Field of Search ........................ 235/462.45, 462.32

(56) References Cited

U.S. PATENT DOCUMENTS

| | | |
|---|---|---|
| 5,170,277 A | 12/1992 | Bard et al. |
| 5,295,014 A | 3/1994 | Toda |
| 5,329,103 A | 7/1994 | Rando |
| 5,828,051 A * | 10/1998 | Goto ........................... 235/467 |
| 5,932,860 A | 8/1999 | Plesko |

FOREIGN PATENT DOCUMENTS

EP    0905801 A2    3/1999

OTHER PUBLICATIONS

Piezo Systems, Inc. Product Catalog, "Piezo Fan Blade, 115 v/60 Hz", http://www.piezo.com/rfn1005.html.
Murata Electronics North America, Inc., "PZT Application Manual", pp. 1–3 and 93–103, http://Iwww.murata.com/murata.nsf/pdf/appguides/$file/pzt_elect_effect.pdf.

* cited by examiner

*Primary Examiner*—Harold I. Pitts

(57) ABSTRACT

A radiation director is coupled to move under the control of a piezoelectric element. The director directs electromagnetic radiation from a radiation source under the control of the piezoelectric element. In a scanning station embodiment, an electrical signal source is connected to cause the piezoelectric element to vibrate, and a radiation detector is positioned to detect radiation from an object scanned by the radiation. In a radiation scanning method, a piezoelectric element is caused to move in a reciprocating fashion, and the movement of the piezoelectric element is used to direct an electromagnetic radiation beam in a scanning motion.

25 Claims, 2 Drawing Sheets

RADIATION DIRECTOR APPARATUS AND METHOD USING PIEZOELECTRIC MOVEMENT

BACKGROUND OF THE INVENTION

1. Field of the Invention

This invention relates to electromagnetic radiation scanning apparatus and methods, and more particularly to radiation director apparatus and method using piezoelectric movement.

2. Description of the Related Art

Most scanning bar code readers use a spinning motor to rotate a multi-faceted mirror; hexagonal mirror facets are typical. Less commonly, other bar code readers use a voice coil to deflect a flat mirror. A laser beam is reflected off the mirror to a scanning area, where it reflects off the bar code carried by an object to be identified and is sensed by an optical detector. The mirror's rotation causes the laser beam to scan across the area, with the scan repeated as the beam strikes each successive mirror facet.

Scanning stations of this type provide a very convenient mechanism for identifying objects, such as in a retail checkout station or on a production line. However, motors employed are relatively bulky and heavy, and consume significant amounts of power.

SUMMARY OF THE INVENTION

In one embodiment of the invention, a radiation director is coupled to move under the control of a piezoelectric element, and a radiation source is configured to direct electromagnetic radiation towards the radiation director. The radiation director directs the radiation under the control of the piezoelectric element.

In another embodiment of the invention, a scanning station comprises a piezoelectric element, an electrical signal source connected to cause the piezoelectric element to vibrate, a radiation director coupled to move under the control of the piezoelectric element, a radiation source configured to direct electromagnetic radiation towards the radiation director, with the director directing the radiation, under the control of the piezoelectric element, toward an object, and a radiation detector positioned to detect radiation from an object scanned by the radiation.

In a radiation scanning method embodiment of the invention, a piezoelectric element is caused to move in a reciprocating fashion, and the movement of the piezoelectric element is used to direct an electromagnetic radiation beam in a scanning motion.

These and other features and advantages of the invention will be apparent to those skilled in the art from the following detailed description, taken together with the accompanying drawings.

DETAILED DESCRIPTION OF THE INVENTION

Embodiments of the invention employ an electromagnetic radiation director that is moved by a piezoelectric element, rather than a voice coil or rotary motor in combination with a rotating mirror, to produce a repetitive beam scanner that can be used to read a bar code or for other scanning purposes. The employment of a piezoelectric element results in a smaller and lighter system with a thin profile, a reduction in power consumption, instant starting with no power surge, and almost no heat dissipation. While the invention can be generalized to a unique technique for directing electromagnetic radiation, in its preferred embodiment it is employed as a bar code reader in which the piezoelectric element is used to scan a light beam across the bar code of an object to be scanned.

Figure 1:
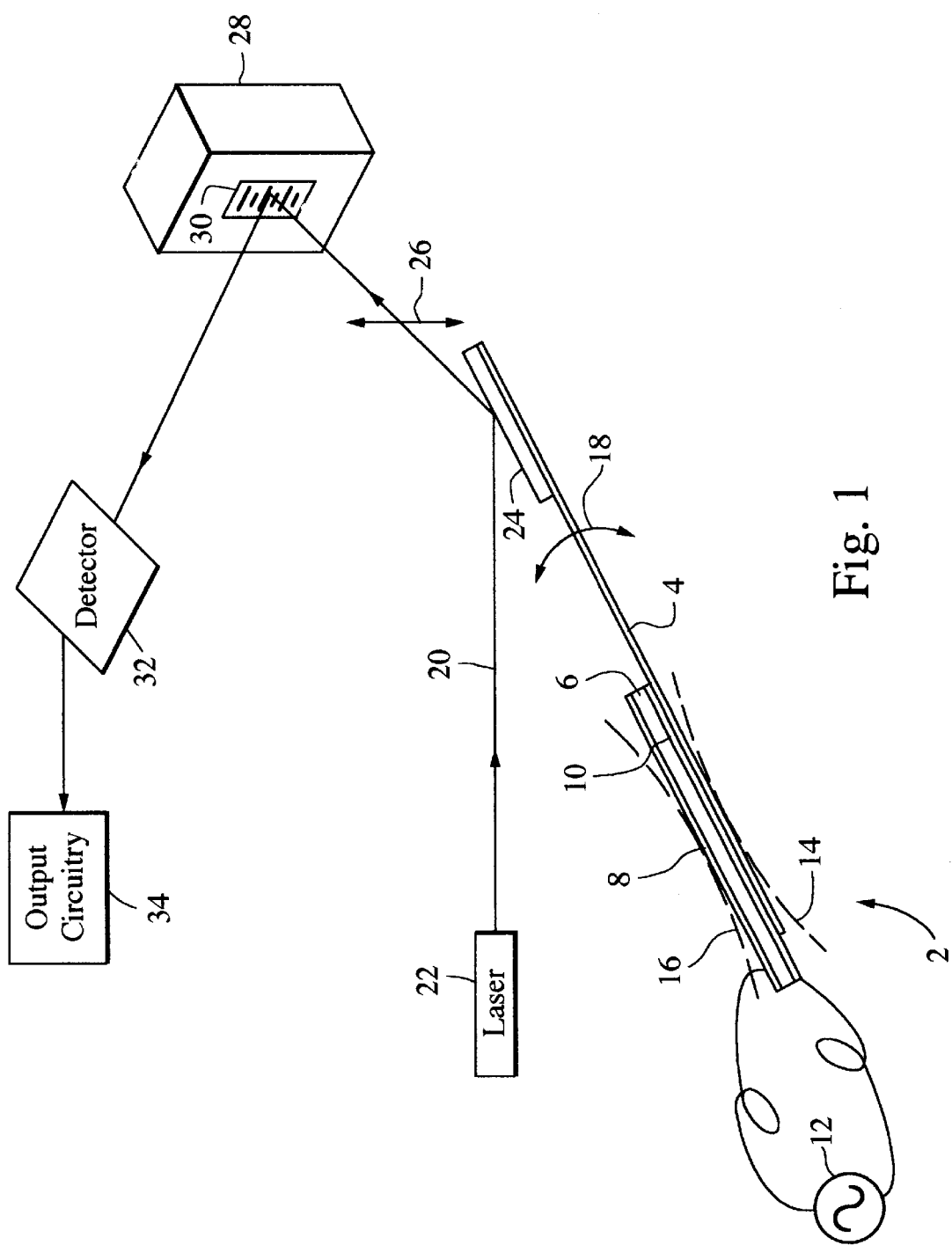
FIG. 1 is a simplified partial block diagram of a scanning station consistent with the teachings of the invention.

An example of such a system is illustrated in FIG. 1. The piezoelectric element, generally indicated by reference number 2, is implemented as a piezoelectric "bender" in which a flexible blade 4, which may be a Mylar® film, is caused to vibrate back and forth by a piezoelectric-induced force. An elongate piezoelectric member 6, which may be formed from any desired piezoelectric material, is sandwiched between a pair of thin film electrodes 8 and 10, with the blade 4 running along the outer surface of one of the electrodes and extending a distance beyond the piezoelectric assembly. The electrodes 8, 10 are configured to be connected across an alternating electrical signal source, such as AC voltage source 12. The alternating electric field established through the piezoelectric member between the opposed electrodes causes the member to move in a reciprocating fashion, contracting first in one direction and then in the other, as the electrical source alternates. The alternate contractions are illustrated in exaggerated form by dash lines 14 and 16. This reciprocating motion causes the blade 4, which is bonded to one of the electrodes, to vibrate as indicated by arrow 18. Piezoelectric benders are known, and can be obtained for example in the form of a Piezo Fan Blade produced by Piezo Systems, Inc. of Cambridge, Mass. As an alternate to providing a separate blade member, the piezoelectric member itself may extend beyond the electrodes so that the extension functions as a blade.

Electromagnetic radiation, preferably in the form of a laser light beam 20 from a laser 22, is directed onto a mirror reflector 24 which is carried by the blade 4, preferably spaced from the dielectric element. The movement of reflector 24 due to the vibration of blade 4 causes the laser beam to scan back and forth in a repetitive fashion, as indicated by arrow 26.

The piezoelectric bender 2 thus serves to redirect the laser beam. This mechanism can be used not just in the context of bar code reading, but whenever it is desired to cause an electromagnetic radiation beam to traverse a linear path; the electrical signal applied to the electrodes on either side of the piezoelectric member control the beam path. If desired, mechanisms other than reflection may be used, such as diffraction, to redirect the beam, with a diffraction element held by and moving with the blade.

Returning to the embodiment illustrated in FIG. 1, the beam 20 is directed by the reflector 24 to scan an area in which bar codes will be presented. For example, this could be a supermarket checkout counter in which an item of merchandise 28 displaying a bar code 30 is moved past the beam. Alternately, the piezoelectric bender and laser could be packaged in a hand-held device used to scan a bar code.

The laser beam scans across the bar code 30 and is reflected back to a radiation detector 32, typically a photodiode or phototransistor. This element converts the received laser beam, as modulated by the bar code, to an electrical signal which is delivered to conventional output circuitry 34 that identifies the bar code and performs any desired output functions.

Figure 2:
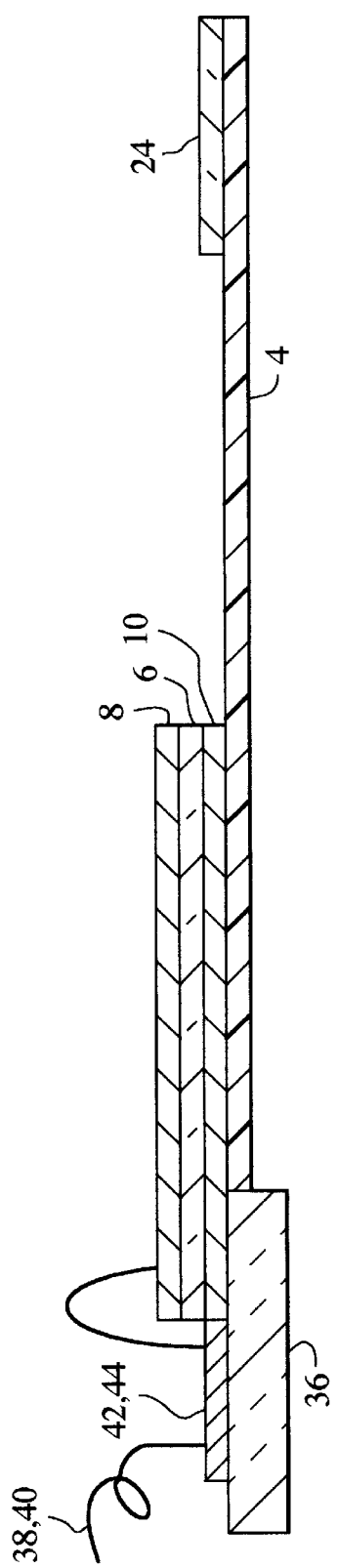
FIG. 2 is a sectional view of an exemplary piezoelectric bender, configured to be employed in the invention, with some of the dimensions exaggerated.

FIG. 2 illustrates an example of a piezoelectric bender as provided by Piezo Systems, Inc., with reflector 24 added by bonding it at one end of the mylar blade 4. The piezoelectric mechanism is provided along the opposite end of the blade, with the lower thin film electrode 10 bonded to the blade and extending somewhat beyond its end, the upper thin film electrode 8 having its outer surface exposed, and the ceramic piezoelectric member 6 sandwiched between the two electrodes. A dielectric circuit board 36 is bonded to the underside of electrode 10 in the area not covered by blade 4, and extends beyond the end of the piezoelectric element. Wires 38, 40 from the electrical signal source 12 (not shown in FIG. 2) are connected to respective conductive traces 42, 44 on the upper surface of circuit board 36, and from there to the upper and lower electrodes 8, 10, respectively. This is shown more clearly in FIG. 3, in which both the wires 38, 40 and the conductive traces 42, 44 are shown separated from each other. Trace 44 can extend along the surface of the circuit board to directly contact the lower electrode 10, while trace 42 can be connected to the upper electrode 8 by a wire 46. Alternate connection mechanisms can also be used, such as feedthroughs or vias that extend through the piezoelectric element from one side to the electrode on the opposite side.

Figure 3:
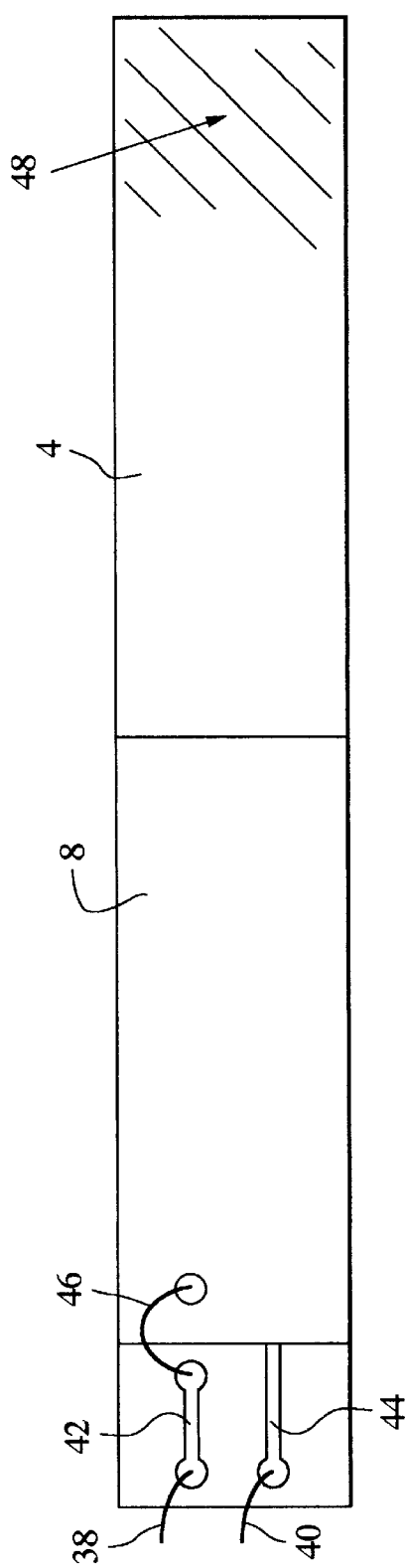
FIG. 3 is a plan view of a piezoelectric bender with an alternate light reflector according to another embodiment of the invention.

The bender illustrated in FIG. 3 is similar to that shown in FIG. 2, but employs a different reflection mechanism. Instead of the discrete mirror reflector 24 employed in FIG. 2, in FIG. 3 the end of the mylar blade itself in area 48 is polished to serve as a reflector.

When implemented as a bar code reader scanning station, the piezoelectric bender can be operated at many different possible oscillation frequencies and scan angles. One such an oscillation frequency range is 60 to 500 Hz (dictated largely by the mass of the mirror), with the beam traversing a scan angle of up to 60 degrees. Any suitable voltage and waveform, such as a sinusoidal, square wave or pulsed waveform, can be used to deflect the mirror, although a sinusoidal waveform is generally preferred.

While particular embodiments of the invention have been shown and described, numerous variations and alternate embodiments will occur to those skilled in the art. For example, the scanning beam may be in other regions of the electromagnetic spectrum than visible, such as ultraviolet or infrared. While a piezoelectric bender is preferred, other mechanisms such as a reciprocating piezoelectric diaphragm may be used to produce a mechanical motion for the reflector, or even to impart a reciprocating motion to the beam source itself. Accordingly, it is intended that the invention be limited only in terms of the appended claims.

We claim:

1. Radiation director apparatus, comprising:
   a piezoelectric element,
   a radiation director coupled to oscillate under the control of said piezoelectric element over an oscillation frequency range that is substantially wider than the low frequency end of said range, and
   a radiation source configured to direct electromagnetic radiation towards said radiation director, said director directing said radiation under the control of said piezoelectric element.

2. The radiation director apparatus of claim 1, said piezoelectric element comprising a piezoelectric bender.

3. The radiation director apparatus of claim 1, said piezoelectric element comprising a piezoelectric member sandwiched between a pair of electrodes, and a blade extending from said piezoelectric member to vibrate in response to an alternating electrical signal applied to said electrodes, said director being mounted to said blade and spaced from said piezoelectric member.

4. The radiation director apparatus of claim 1, wherein said radiation source emits a light beam.

5. The radiation director apparatus of claim 1, said radiation director comprising a reflector.

6. A scanning station, comprising:
   a piezoelectric element,
   an electrical signal source connected to cause said piezoelectric element to vibrate,
   a radiation director coupled to oscillate under the control of said piezoelectric element over an oscillation frequency range that is substantially wider than the low frequency end of said range,
   a radiation source configured to direct electromagnetic radiation towards said radiation director, said director directing said radiation, under the control of said piezoelectric element, toward an object, and
   a radiation detector positioned to detect radiation from an object scanned by said radiation.

7. The scanning station of claim 6, wherein said director directs said radiation in a scanning motion in response to an alternating electrical signal applied to said piezoelectric element by said signal source.

8. The scanning station of claim 6, wherein said radiation detector is configured to read bar codes scanned by said radiation.

9. The scanning station of claim 6, wherein said electrical signal source is configured to apply one of a sinusoidal, square wave or pulsed waveform to said piezoelectric element.

10. The scanning station of claim 6, said piezoelectric element comprising a piezoelectric bender.

11. The scanning station of claim 6, said piezoelectric element comprising a piezoelectric member sandwiched between a pair of electrodes, and a blade extending from said piezoelectric member to vibrate in response to an alternating electrical signal applied to said electrodes, said director being mounted to said blade and spaced from said piezoelectric member.

12. The scanning station of claim 6, wherein said radiation source emits a light beam.

13. The scanning station of claim 6, said radiation director comprising a reflector.

14. A radiation scanning method, comprising:
   causing a piezoelectric element to oscillate in a reciprocating fashion over an oscillation frequency range that is substantially wider than the low frequency end of said range, and
   using the movement of said piezoelectric element to direct an electromagnetic radiation beam in a scanning motion.

15. The method of claim 14, further comprising detecting radiation reflected from an object scanned by said radiation beam.

16. The method of claim 15, said radiation detecting step comprising reading a bar code scanned by said radiation beam.

17. The method of claim 14, said step of causing further comprising causing a piezoelectric bender to move in said reciprocating fashion.

18. The method of claim 17, wherein said piezoelectric bender is caused to move in said reciprocating fashion by applying an alternating electrical signal to it.

19. The method of claim 17, said step of causing said piezoelectric bender to move further comprising causing a piezoelectric member to move in a reciprocating fashion, said piezoelectric member sandwiched between a pair of electrodes with a blade extending from said piezoelectric member.

20. The method of claim 19, wherein an alternating electrical signal is applied to said electrodes to vibrate said blade.

21. The method of claim 19, said step of using further comprising using the movement of said piezoelectric member, said blade bearing a reflector spaced from said piezoelectric member, to reflect said electromagnetic radiation beam in said scanning motion.

22. The method of claim 21, wherein said reflector is discrete from said piezoelectric member.

23. The radiation director apparatus of claim 3, said blade comprising a polyester film.

24. The scanning station of claim 11, said blade comprising a polyester film.

25. The method of claim 21, said blade comprising a polyester film.

* * * * *